United States Patent
Hamid et al.

(10) Patent No.: US 8,286,158 B2
(45) Date of Patent: Oct. 9, 2012

(54) METHOD AND SYSTEM FOR INSTALLING PORTABLE EXECUTABLE APPLICATIONS

(75) Inventors: Laurence Hamid, Ottawa (CA); Marc Charbonneau, Casselman (CA)

(73) Assignee: Imation Corp., Oakdale, MN (US)

( * ) Notice: Subject to any disclaimer, the term of this patent is extended or adjusted under 35 U.S.C. 154(b) by 1830 days.

(21) Appl. No.: 11/347,259

(22) Filed: Feb. 6, 2006

(65) Prior Publication Data

US 2007/0234344 A1 Oct. 4, 2007

(51) Int. Cl.
*G06F 9/445* (2006.01)

(52) U.S. Cl. ........................................ 717/174; 717/175

(58) Field of Classification Search ........................ None
See application file for complete search history.

(56) References Cited

U.S. PATENT DOCUMENTS

| | | | |
|---|---|---|---|
| 4,724,521 A * | 2/1988 | Carron et al. | 717/175 |
| 5,367,686 A * | 11/1994 | Fisher et al. | 717/174 |
| 5,481,714 A * | 1/1996 | Pipkin et al. | 717/175 |
| 5,586,323 A * | 12/1996 | Koizumi et al. | 717/174 |
| 5,666,533 A * | 9/1997 | Horiguchi et al. | 718/100 |
| 5,715,463 A * | 2/1998 | Merkin | 717/175 |
| 6,096,096 A * | 8/2000 | Murphy et al. | 717/175 |
| 6,226,747 B1 * | 5/2001 | Larsson et al. | 726/31 |
| 6,253,258 B1 * | 6/2001 | Cohen | 719/331 |
| 6,272,674 B1 * | 8/2001 | Holiday, Jr. | 717/174 |
| 6,289,397 B1 * | 9/2001 | Tsuyuguchi et al. | 710/1 |
| 6,480,867 B1 * | 11/2002 | Kwan | 715/234 |
| 6,615,405 B1 * | 9/2003 | Goldman et al. | 717/174 |
| 6,658,571 B1 * | 12/2003 | O'Brien et al. | 726/26 |
| 6,763,518 B2 * | 7/2004 | Hart et al. | 718/1 |
| 6,983,460 B1 * | 1/2006 | Goire et al. | 717/175 |
| 7,069,442 B2 * | 6/2006 | Sutton et al. | 713/179 |
| 7,398,532 B1 * | 7/2008 | Barber et al. | 719/328 |
| 2002/0065945 A1 * | 5/2002 | Calder et al. | 709/313 |
| 2002/0083183 A1 | 6/2002 | Pujare et al. | |
| 2002/0092003 A1 * | 7/2002 | Calder et al. | 717/138 |
| 2002/0100037 A1 * | 7/2002 | Kitagawa | 717/174 |
| 2002/0107907 A1 * | 8/2002 | Case et al. | 709/203 |
| 2002/0188938 A1 * | 12/2002 | Dong et al. | 717/174 |
| 2003/0174167 A1 * | 9/2003 | Poo et al. | 345/752 |
| 2003/0188165 A1 * | 10/2003 | Sutton et al. | 713/176 |
| 2004/0001088 A1 | 1/2004 | Stancil et al. | |
| 2004/0148600 A1 * | 7/2004 | Hoshino | 717/174 |
| 2005/0015761 A1 * | 1/2005 | Chang et al. | 717/174 |
| 2005/0076326 A1 | 4/2005 | McMillan et al. | |

(Continued)

OTHER PUBLICATIONS

Steve Makofsky "Portable CE" Dec. 20, 2004 The Furrygoat Experience <http://www.furrygoat.com/2004/12/20/portable-ce/> pp. 1-9.*

(Continued)

*Primary Examiner* — Thuy Dao
*Assistant Examiner* — Samuel Hayim
(74) *Attorney, Agent, or Firm* — Kenneth E. Levitt; Dorsey & Whitney LLP (57) ABSTRACT

According to the invention, a first executable environment is provided. The first executable environment is for execution within an operating system environment of a host computer system. The first executable environment is not an emulator for emulating any of another processor and another operating system. A software application is provided for installation and execution within the operating system environment. The software application is for fixed installation and not for installation in a portable fashion for being ported from one host computer system to another. The software application is then installed within the first executable environment, the installed software application installed within a removable peripheral memory storage device for execution within the first executable environment.

27 Claims, 6 Drawing Sheets

U.S. PATENT DOCUMENTS

| | | | |
|---|---|---|---|
| 2005/0114643 A1* | 5/2005 | Bryant-Rich et al. | 713/1 |
| 2005/0114870 A1* | 5/2005 | Song et al. | 719/328 |
| 2005/0166201 A1 | 7/2005 | Lai | |
| 2005/0193389 A1* | 9/2005 | Murphy et al. | 717/175 |
| 2005/0198485 A1* | 9/2005 | Nguyen et al. | 713/1 |
| 2005/0240921 A1* | 10/2005 | Barker et al. | 717/175 |
| 2006/0026414 A1 | 2/2006 | Firebaugh et al. | |
| 2006/0130004 A1* | 6/2006 | Hughes et al. | 717/131 |
| 2006/0218549 A1* | 9/2006 | Hsu et al. | 717/174 |
| 2007/0168937 A1* | 7/2007 | Mallick | 717/106 |
| 2008/0010630 A1* | 1/2008 | Ou-Yang et al. | 717/121 |

OTHER PUBLICATIONS

Wikipedia "Installation (computer programs)" Feb. 24, 2011 Wikipedia the Free Encyclopedia <http://en.wikipedia.org/wiki/Installation_(computer_programs)> all pp. 1-5.*

Michael Steffen Oliver Franz, "Code-Generation On-the-Fly: A Key to Portable Software", Swiss Federal Institute of Technology Zurich, 1994, <http://moldovacc.md/acoulichev/th10497.pdf> pp. 1-54.*

Jean-Marie Favre, "A Rigorous Approach to Support the Maintenance of Large Portable Software", IEEE, 1997, <http://ieeexplore.ieee.org/stamp/stamp.jsp?tp=&arnumber=583003> pp. 44-47.*

P.J. Brown, "Levels of Language for Portable Software", ACM, 1974, <http://delivery.acm.org/10.1145/370000/361624/p1059-brown.pdf> pp. 1059-1062.*

EPO, "Supplementary European Search Report", dated Feb. 12, 2010, pp. 1 to 6.

Garfinkel T et al: "Virtual Machine Monitors: Current Technology and Future Trends" Computer, IEEE Service Center, Los Alamitos, CA, US, vol. 38, No. 5, May 1, 2005, pp. 39-47, ISSN: 0018-9162.

Fabrice Bellard: QEMU, a Fast and Portable Dynamic Translator: USENIX Annual Technical Conference 2005, pp. 41-46, retrieved from the Internet: URL:http://www.usenix.org/event/usenix05/tech/freenix/full_papers/bellard/bellard.pdf, Feb. 5, 2010.

Matthew Bloch: "Dropping Windows with WineLib" Jan. 1, 2003, retrieved from the Internet: URL:http://www.drdobbs.com/cpp/184401635, Feb. 5, 2010.

* cited by examiner

METHOD AND SYSTEM FOR INSTALLING PORTABLE EXECUTABLE APPLICATIONS

FIELD OF THE INVENTION

The invention relates generally to portable memory storage devices and more particularly to a method and system for installing applications within portable memory storage devices.

BACKGROUND OF THE INVENTION

As computer processing power has increased, the complexity of operating systems has increased. With increasing operating system complexity, installation of devices within the operating system and installation of applications requires more dynamic linked library (DLL) files and other system level files associated with an application.

Unfortunately, whereas the Apple II Plus® allowed for portability of an application without installation thereof between many different computers simply by porting the floppy disk on which the application instruction data was stored between the different computers, today's computer systems limit portability of applications due to the complex installation process and the system level files thereby installed.

Limited portability of applications also acts to support common application installations within an environment. Thus, within a same business, typically each employee has a computer system that is commonly configured with same software applications to support common data file formats and portability of data files. Further, removable peripheral memory storage devices such as USB memory keys are commonly used to port data between computer systems.

Unfortunately, some software applications do not readily lend themselves to widespread installation—either due to cost or to limited requirements for their use. Further, with the size and portability of USB memory keys, porting of data to locations outside of the business environment often occurs where common applications may or may not be available.

One solution to this problem is to provide user data that is self executing. This is common in self extracting compressed files wherein the extraction data is stored within the data file including the compressed data. Self extracting files, due to their limited system calls—memory access and storage access—are easily implemented in a system independent fashion. Conversely, a word processor with its system calls is not well suited to being implemented in a system independent fashion nor is it compact allowing for easy portability with each word processor data file.

It would be advantageous to provide a method of porting software applications that supports more complex software applications and allows for execution of those applications within different host computer environments without requiring the software application to be installed within each host computer environment

SUMMARY OF THE INVENTION

In accordance with the invention there is provided a method comprising: providing a first executable environment, the first executable environment for execution within an operating system environment of a host computer system, the first executable environment for other than emulating any of another processor and another operating system; providing a software application for installation and execution within the operating system environment, the software application other than for installation in a portable fashion for being ported from one host computer system to another; and, installing the software application within the first executable environment, the installed software application installed within a removable peripheral memory storage device for execution within the first executable environment.

In accordance with another aspect of the invention there is provided a removable peripheral memory storage device comprising: non-volatile random access memory; and software application data stored within the non-volatile random access memory, the software application data for when executed within a first executable environment resulting in execution of the software application, the first executable environment other than a host system operating system, an operating system emulator for an operating system other that the host system operating system, and a processor emulator for a processor other than the host system processor, wherein the software application once installed within the removable peripheral memory storage device is executable within any of a plurality of host computer systems each supporting the first executable environment absent installation of system level files, and data of the software application within each of the plurality of host computer systems.

In accordance with the invention there is provided a method comprising: providing a first executable environment, the first executable environment for execution within a first operating system environment of a host computer system, the first executable environment for other than emulating any of another processor and another operating system; providing a second executable environment, the second executable environment for execution within a second operating system environment of a second other host computer system, the second executable environment for other than emulating any of another processor and another operating system; and providing a software application for installation and execution within the first operating system environment and the second operating system environment, the software application other than for installation in a portable fashion for being ported from one host computer system to another; and, installing the software application within the first executable environment, the installed software application installed within a storage device for execution within each of the first executable environment and the second executable environment and accessible to each of the host computer system and the second other host computer system.

Advantageously, some embodiments of the invention allow for use of hardware specific features of a device absent installation of device drivers. This is particularly beneficial when permission to modify the host computer environment is unavailable.

BRIEF DESCRIPTION OF THE DRAWINGS

The invention will now be described with reference to particular embodiments details of which are shown in the attached drawings where.

DETAILED DESCRIPTION OF EMBODIMENTS OF THE INVENTION

In the description set out herein below, the term portable storage medium refers to portable storage media such as USB storage media, portable hard drives, PCMCIA memory devices, DVDROMs, CDROMs, and portable magnetic storage media. Further, the method applies to software installed within network drives, the software developed for other than portable installation.

Figure 1:
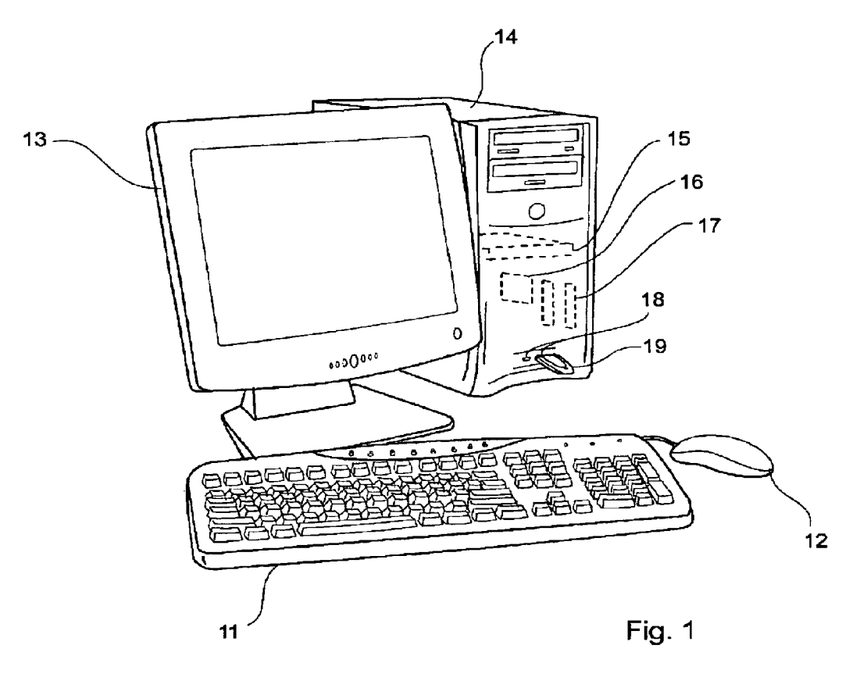
FIG. 1 shows a simplified schematic diagram illustrating a computer system for use with the herein described embodiments of the present invention.

Referring to FIG. 1, shown is a simplified schematic diagram of a computer system including a keyboard 11, a mouse 12, a monitor 13, a computer 14 including internal hard drive 15, processor 16, and memory 17, and an interface port 18 in the form of a USB port. Coupled to the interface port 18 is a removable peripheral memory storage device 19 in the form of a USB memory storage device sometimes referred to as a USB memory key.

Figure 2A:
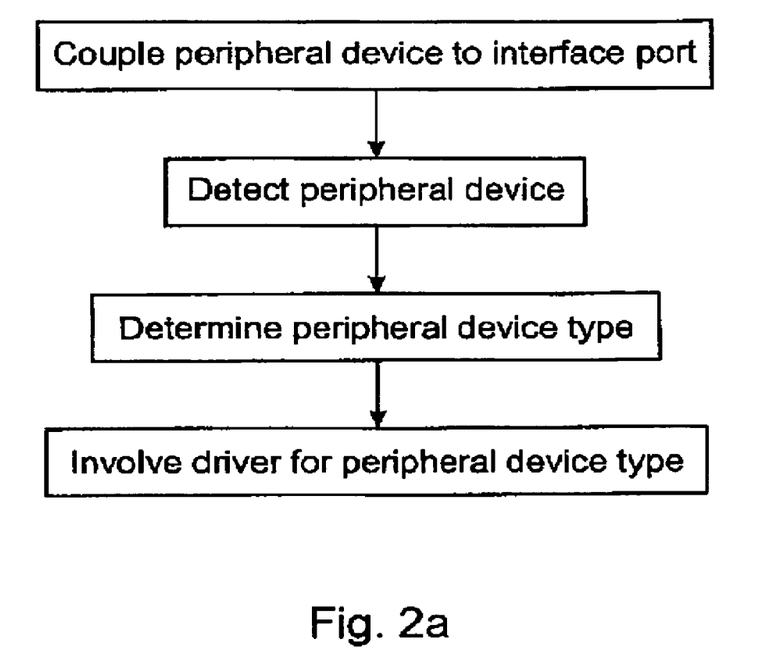
FIG. 2a is a simplified flow diagram of a method of employing a removable storage medium for installing software within a host computer system.

Referring to FIG. 2a, shown is a simplified flow diagram of a method of using the removable peripheral memory storage device 19. The removable peripheral memory storage device 19 is coupled with the interface port 18. Upon coupling therewith, the removable peripheral memory storage device 19 is detected by the processor 16, which interrogates the removable peripheral memory storage device 19 to determine what device it is. When it is determined that the removable peripheral memory storage device 19 is a USB key, a standard USB key driver is invoked for managing the removable peripheral memory storage device 19 coupled to the interface port 18. Thus, data stored within the removable peripheral memory storage device 19 is accessible to processes in execution by the processor 16. Further, data from within the removable peripheral memory storage device 19 is available for copying to the memory 17 and data within the memory 17 is available for copying to the removable peripheral memory storage device 19. Also of note, applications that are typically stored within portable devices such as CD-ROMS and DVD-ROMS are executable directly from the removable peripheral memory storage device 19.

Figure 2B:
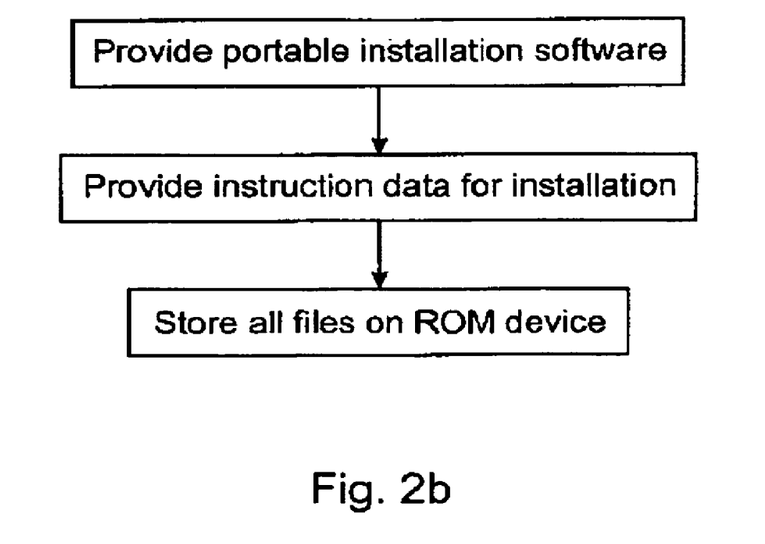
FIG. 2b is a simplified flow diagram of a method of employing a removable storage medium such as a DVD ROM for installing software within a host computer system.

Referring to FIG. 2b, shown is a simplified flow diagram of a method of installing software within a portable storage medium in the form of a CD-ROM or a DVD-ROM according to the prior art. An install software application is provided for use in installing of application software onto an internal hard drive. The install software includes several modules including a licensing module for ensuring that each user is apprised of the software license for installed software; an interrogation module for determining operating system and hardware configuration of a computer system on which to install the software; a file copying module for copying files necessary for the installation to the internal hard drive; an installation module for installing the software application on the computer system; and a clean up module for finishing the installation and deleting any unnecessary files copied during and for the installation process.

As is evident to those of skill in the art, the interrogation module allows the software to operate on a variety of systems having a same or similar operating system. Further, the design of the installation software application is such that it does not rely on configuration specific features in order to operate, and as such, is generic to different hardware and software configurations—typically a subset of operating system versions from a same operating system vendor. That said, the installed software optionally varies for different hardware and software configurations. This is achieved by providing different install versions depending on the hardware and software configuration. Of note, in order to support these different configurations, extra install data is stored within the storage medium from which the installation occurs.

Figure 3:
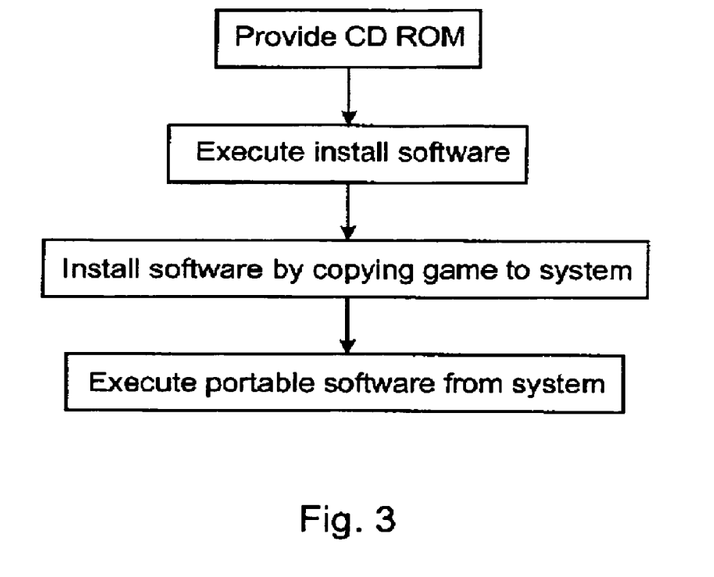
FIG. 3 is a simplified flow diagram of a method of installing a software application specifically designed for installation within a portable storage medium and for porting between different computer systems.

Referring to FIG. 3, shown is a simplified flow diagram of a method of installing software within a portable storage medium according to the prior art. A first software application is provided on a read only storage medium for installation onto a portable RAM storage medium. The application is specifically designed for installation in portable storage media. The software application is developed specifically for computer system independent installation. The software application includes processes for interfacing with different computers either using only standard drivers and libraries of the different computers. Thus, the software application has limited efficiency and functionality as it is incapable of optimizing performance or using advanced features based on selection of routines and services from available hardware and libraries. Alternatively, computer system independence is achieved by interrogating the computer system on which the software is in execution to ensure that only allowable libraries are used. In such an implementation, the efficiency of the resulting software application in execution is optionally improved at the cost of expanded storage requirements for software supporting different hardware and operating system configurations.

Problematically, software designed for execution on multiple systems is not the norm. Typically, software developers seek to provide software installation that allows for efficient single computer system installation of software. Typical installations of software applications are ill suited for installation on the removable peripheral memory storage device 19.

Figure 4:
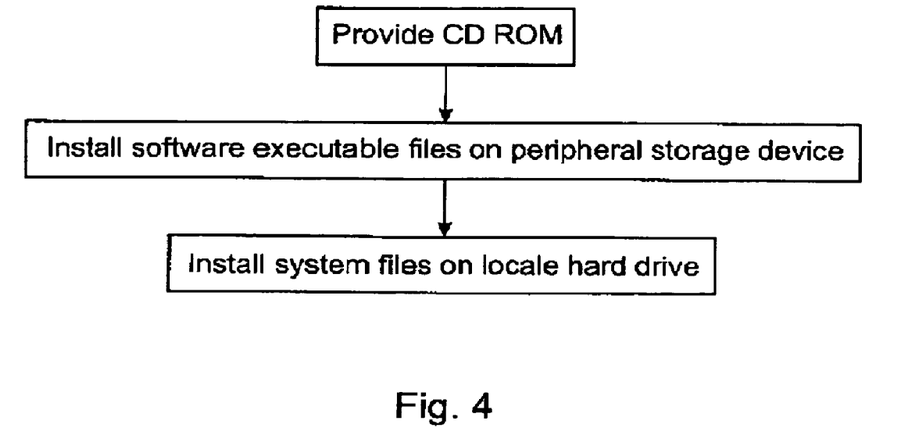
FIG. 4 is a simplified flow diagram of a method of installing a software application within a removable peripheral memory storage device for use only with a single host computer system according to the prior art.

Referring to FIG. 4, a simplified flow diagram of a typical software application installation within a removable peripheral memory storage device 19 and execution thereof is shown. A software application is installed using storage memory within the removable peripheral memory storage device 19. The application data is stored within the removable peripheral memory storage device 19 and system files for operation therewith are installed within appropriate system folders of the computer system. The software application, once installed, is executable within the computer system on which it was installed. Thus, the memory storage of the removable peripheral memory storage device 19 is useful for storing of the software application but its portability is lost because system related files and data are stored within the computer system's operating system directories and registry in the case of Windows® based operating systems of the internal hard drive 15. As these files and data are used in execution of the software application, the software application is for execution exclusively on the system on which it was installed.

Figure 5:
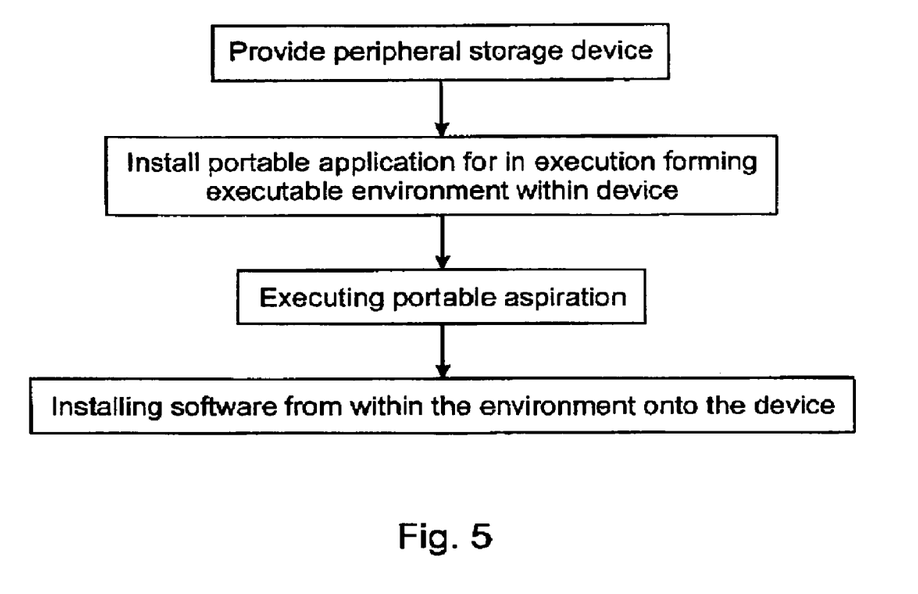
FIG. 5 is a simplified flow diagram of a method of installing a software application within a removable peripheral memory storage device during execution of a first executable environment, the software application for executing on any of a number of host computer systems each having the first executable environment in execution thereon.

Referring to FIG. 5, a simplified flow diagram of a method according to an embodiment of the invention is shown for installing software applications other than developed for portable installation thereof in a portable storage medium in the form of a removable peripheral memory storage device and for maintaining portability thereof once so installed.

Within the removable peripheral memory storage device 19 is installed a first software application for providing an environment for execution therein of software applications. The environment is designed to be executed from portable memory devices and, as such, is not configured for execution solely within a single system. Here, this is achieved when the environment, during execution, interrogates the host computer system to determine its capabilities—both software and hardware. The first software application is executed for forming the environment. Within the environment, a second software application is installed within the removable peripheral memory storage device 19. Thus, the installation process for the second software application interrogates the environment formed by the first software application and installs the second software application within that environment. Preferably, the second software application does not need modifications to install properly within the first software application environment. Further preferably, the first software application environment is designed for supporting a plurality of software applications for execution therein without modifications to the plurality of software applications from their form for execution absent the first software application environment. The software is configured for proper execution within the environment and the environment addresses any system specific issues that arise due to porting of the removable peripheral memory storage device 19. Thus, an application intended for a fixed single system installation becomes a portable application without any necessary modifications thereto. This is highly advantageous. Typically, this is achieved for second software applications that are absent installation requirements for additional core kernel services ex: drivers or Windows® services.

During execution of the second software application, the environment is first executed and the second software application is executed within the environment. Environment specific library calls result in execution of either the environment library call to perform the function or in indirect execution of one or more system library call depending on the available system libraries and hardware as determined during interrogation of the computer system. By generating environment libraries, environment data, and capabilities that mimic operating system libraries, data, and capabilities, installation is straightforward relying on the existing installation software application. As such, the environment optionally supports unmodified software and installation software to provide heretofore unavailable portability.

Figure 6:
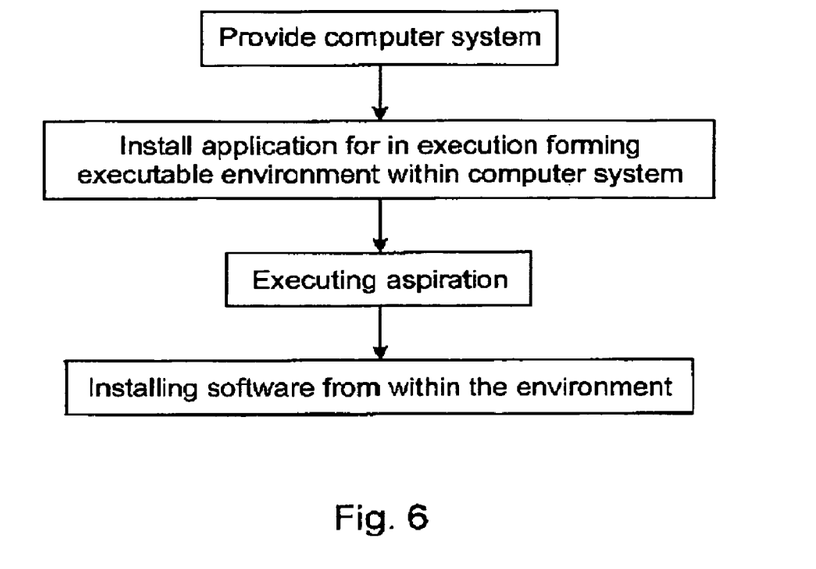
FIG. 6 is a simplified flow diagram of a method of installing a software application within a removable peripheral memory storage device during execution of a first executable environment, the software application for executing on any of a number of host computer systems each having the first executable environment installed thereon.

Referring to FIG. 6, a simplified flow diagram of a method according to an embodiment of the invention is shown for installing software applications other than developed for portable installation thereof in a portable storage medium in the form of a removable peripheral memory storage device and for maintaining portability thereof once so installed.

Within the computer system is installed a first software application for providing an environment for execution therein of software applications. The environment is designed to be executed solely within a single system. The first software application is executed for forming the environment. Within the environment, a second software application is installed within the removable peripheral memory storage device 19. Thus, the installation process for the second software application interrogates the environment formed by the first software application and installs the second software application within that environment. The software is configured for proper execution within the environment and the environment addresses any system specific issues that arise due to porting of the removable peripheral memory storage device 19. Thus, an application intended for a fixed single system installation becomes a portable application to any computer system having the environment—the first software application—installed therein without any necessary modifications thereto. Another advantage, in general, is an ease with which an environment is initiated rendering access to portable software applications convenient. This is highly advantageous.

During execution of the second software application, the environment is first executed and the second software application is executed within the environment. Environment specific library calls result in execution of either the environment library call to perform the function or in indirect execution of one or more system library call depending on the available system libraries and hardware as determined during installation of the environment. By generating environment libraries, environment data, and capabilities that mimic operating system libraries, data and capabilities, installation is straightforward relying on the existing installation software application. As such, the environment optionally supports unmodified software and installation software to provide heretofore unavailable portability.

Figure 7:
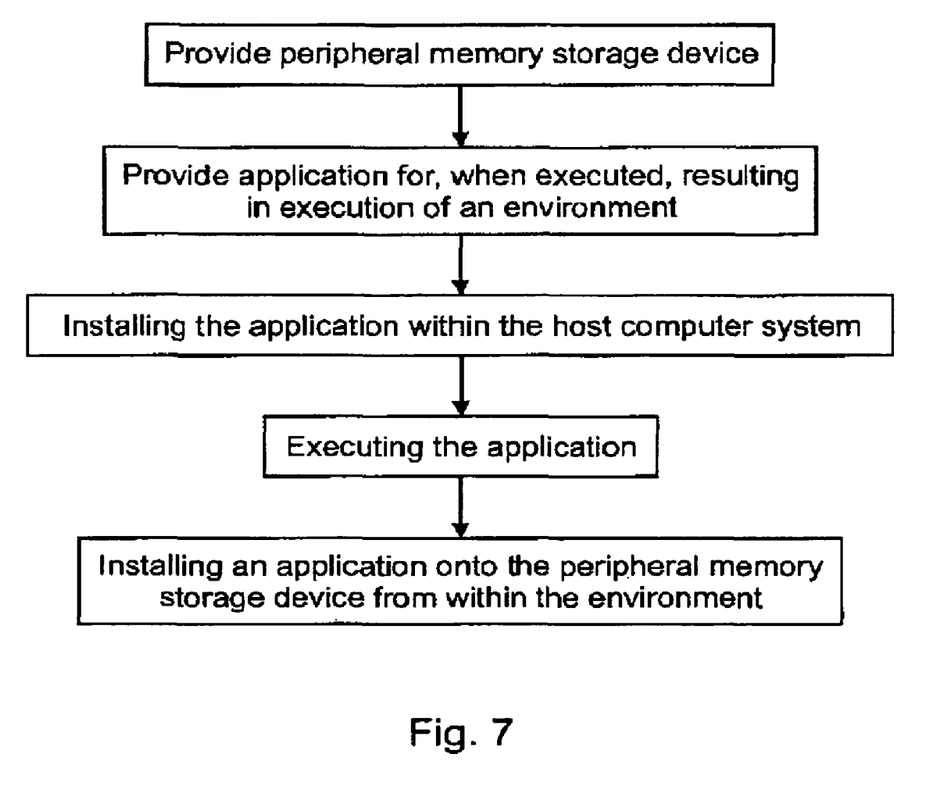
FIG. 7 is a simplified flow diagram of a method of installing a software application within a removable peripheral memory storage device during execution of a first executable environment, the software application for executing on any of a number of host computer systems, the peripheral memory storage device having the first executable environment stored therein for execution within each of a plurality of different host computer systems, the software application for execution on each of said plurality of host computer systems.

Referring to FIG. 7, a simplified flow diagram of a method according to an embodiment of the invention is shown for installing software applications other than developed for portable installation thereof in a portable storage medium in the form of a removable peripheral memory storage device and for maintaining portability thereof once so installed.

Within the removable peripheral memory storage device 19 is a first installation software application for installing first software for providing an environment for execution therein of software applications. The environment is designed to be executed from the computer system and to be installed from the portable memory device and, as such, is preferably a small and easily portable application. The first software application when installed is executed for forming the environment. Within the environment, a second software application is installed within the removable peripheral memory storage device 19. Thus, the installation process for the second software application interrogates the environment formed by the first software application and installs the second software application within that environment. The software is configured for proper execution within the environment and the environment addresses any system specific issues that arise due to porting of the removable peripheral memory storage device 19. Thus, an application intended for a fixed single system installation becomes a portable application without any necessary modifications thereto. This is highly advantageous.

Further advantageously, the removable peripheral memory storage device has all the necessary data for installing and executing the first software application and the second software application thereby rendering the second software application portable as described in the previous embodiment and the first software installation application portable to ensure compatibility, even with unknown computer systems not having the first software application installed thereon.

During execution of the second software application, the environment is first executed and the second software application is executed within the environment. Environment specific library calls result in execution of either the environment library call to perform the function or in indirect execution of one or more system library call depending on the available system libraries and hardware as determined during installation of the first software application. By generating environment libraries, environment data, and capabilities that mimic operating system libraries, data, and capabilities, installation is straightforward relying on the existing installation software application. As such, the environment optionally supports unmodified software and installation software to provide heretofore unavailable portability.

Figure 8:
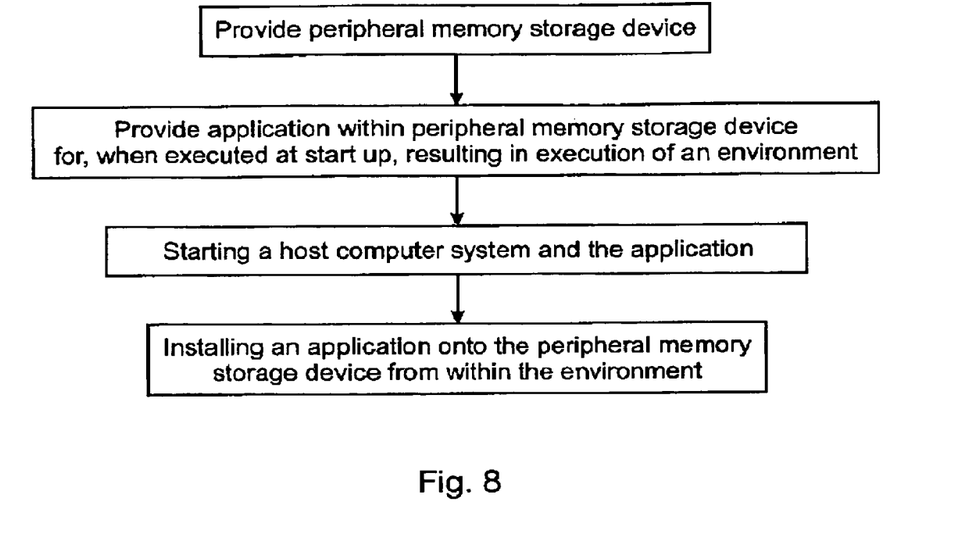
FIG. 8 is a simplified flow diagram of a method of installing a software application within a removable peripheral memory storage device during execution of a first executable environment, the software application for executing on any of a number of host computer systems, the peripheral memory storage device having the first executable environment stored therein for execution within each of a plurality of different host computer systems at start up thereof, the software application for execution on each of said plurality of host computer systems; and, FIG. 9 is a simplified flow diagram of a method of installing a software application within a removable peripheral memory storage device during execution of a first executable environment, the software application for executing on any of a number of host computer systems, the peripheral memory storage device having the first executable environment stored therein for execution within each of a plurality of different host computer systems, some of the host computer systems having a different operating system or a different processor or both from others of the different host computer systems.

Referring to FIG. 8, a simplified flow diagram of a method according to an embodiment of the invention is shown for installing software applications other than developed for portable installation thereof in a portable storage medium in the form of a removable peripheral memory storage device and for maintaining portability thereof once so installed.

Within the removable peripheral memory storage device 19 is installed a first software application for providing an environment for execution therein of software applications. The environment is designed to be executed from portable memory devices and, as such, is not configured for execution solely within a single system. Here, this is achieved at system start up when the removable peripheral memory storage device executes the first application for forming the environment and during execution, interrogates the host computer system to determine its capabilities—both software and hardware—and installs any desired libraries and drivers for the environment. Within the environment, a second software application is installed within the removable peripheral memory storage device 19. Thus, the installation process for the second software application interrogates the environment formed by the first software application and installs the second software application within that environment. The software is configured for proper execution within the environment and the environment addresses any system specific issues that arise due to porting of the removable peripheral memory storage device 19. Thus, an application intended for a fixed single system installation becomes a portable application without any necessary modifications thereto. Advantageously, by executing the environment at start up, it is possible to install libraries and drivers to render the environment and software applications executing therein more efficient.

During execution of the second software application, environment specific library calls are easily executed as the library calls are either installed or actively indirectly make system library or driver calls. By generating environment libraries and capabilities that mimic operating system libraries and capabilities, installation is straightforward relying on the existing installation software application. As such, the environment optionally supports unmodified software and installation software to provide heretofore unavailable portability.

Figure 9:
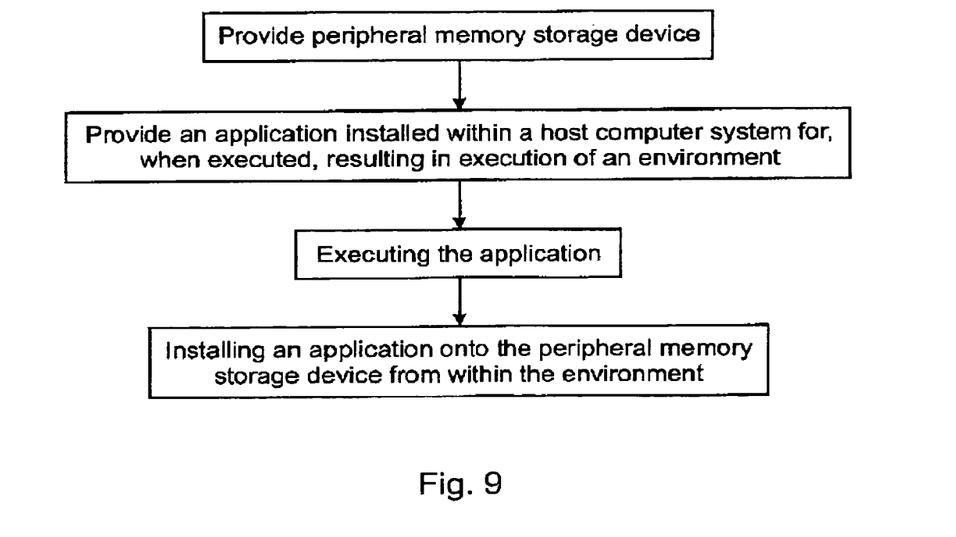

Referring to FIG. 9, a simplified flow diagram of a method according to an embodiment of the invention is shown for installing software applications other than developed for portable installation thereof in a portable storage medium in the form of a removable peripheral memory storage device and for maintaining portability thereof once so installed.

Within each computer system is installed a first software application for providing an environment for execution therein of software applications. The first software application is executed for forming the environment. Within the environment, a second software application is installed within the removable peripheral memory storage device 19. Thus, the installation process for the second software application interrogates the environment formed by the first software application and installs the second software application within that environment. The software is configured for proper execution within the environment and has different modules installed for supporting different operating systems and/or different hardware configurations and the environment addresses any system specific issues that arise due to porting of the removable peripheral memory storage device 19. Thus, an application intended for a fixed single system installation becomes a portable application without any necessary modifications thereto, the second software application portable between different operating systems and different computer hardware. This is highly advantageous.

During execution of the second software application, the environment is first executed and the second software application is executed within the environment. Because the environment knows about the computer system on which it is installed, it causes to be executed those portions of the second software application or that version of the second software application that relates to the hardware and operating system environment. Environment specific library calls result in execution of either the environment library call to perform the function or in indirect execution of one or more system library call depending on the available system libraries and hardware as determined during interrogation of the computer system. By generating environment libraries, environment data, and capabilities that mimic operating system libraries, data and capabilities, installation is straightforward relying on the existing installation software application. As such, the environment optionally supports unmodified software and installation software to provide heretofore unavailable portability.

Optionally the environment supports second software applications implemented for execution within different operating systems on a same processor. Further optionally the environment supports second software applications implemented for execution on different processors.

Of course, though the above embodiments are described with reference to removable peripheral memory storage devices, they are equally applicable to removable media devices such as portable hard disk drives, PCMCIA memory devices, USB memory devices, USB hard disk drives, compact flash memory devices, memory stick devices, and other portable flash RAM and hard disk based devices. Further, the above embodiments apply to providing portability for software that is other than developed to support portability With any of the above mentioned devices, the read/write random access memory provides similar performance capabilities to the internal hard drive 15 but with the additional advantage of portability. Further, by storing the application data on the removable peripheral memory storage device, the application and data are readily available simply through the act of porting the removable peripheral memory storage device.

Further, it is also possible to extend the teachings of the present invention to passive storage media such as CD-ROMS, DVD-ROMS, floppy disk drives, removable media, and so forth.

In an embodiment, an ActiveX forms part of a HTML page. The page and the Active X are downloaded. The ActiveX control then downloads executable data and launches it, for example by also injecting itself into it. As the program relies on access to registry and/or files, calls are forwarded to the world wide web server and information is then returned to the client. Advantageously, this solution does not require installation on a client system other than an ActiveX control execution which is often already present. Also, the application is executed on the client system and not on the server system and thus maintains a controllable its level of security.

Numerous other embodiments may be envisaged without departing from the spirit or scope of the invention.

What is claimed is:

1. A method comprising:
providing a first executable environment disposed to allow application programs to be installed and executed within a removable peripheral memory storage device, the first executable environment for execution within an operating system environment of a host computer system;
providing a software application originally configured for installation and execution within the operating system environment, the software application originally configured for fixed system installations, and configured for other than being ported from one host computer system to another, the software application provided for installation and execution within the first executable environment;
installing the software application within the first executable environment within the removable peripheral memory storage device, wherein during installing of the software application within the first executable environment, system related files and data of the software application that are originally configured to be stored within the operating system environment upon installation are instead other than stored within the operating system environment, and files and data analogous to the system related files and data are stored within the first executable environment within the removable peripheral memory storage device, wherein during execution of the software application, the first executable environment:

intercepts an environment specific call made by the software application intended for the host computer system to perform a function;
determines whether the environment specific call is supported by the first executable environment and whether the environment specific call is supported by the host computer system; and
makes an executable environment call to the first executable environment to perform the function if the environment specific call is supported by the first executable environment and makes a system library call to the host computer system to perform the function if the environment specific call is supported by the host computer system and if the environment specific call is other than supported by the first executable environment, wherein the first executable environment is for other than emulating any of:
a processor external to the host computer system, and
an operating system other than the operating system environment.

2. A method according to claim 1, wherein the removable peripheral memory storage device comprises a universal serial bus (USB) memory key.

3. A method according to claim 2, wherein the USB memory key comprises flash random access memory (RAM).

4. A method according to claim 2, wherein the USB memory key comprises a hard drive.

5. A method according to claim 1, wherein the operating system is a Windows based operating system.

6. A method according to claim 5, wherein the first executable environment is an environment for executing of Windows compatible software therein.

7. A method according to claim 6, wherein
the first executable environment intercepts application specific system library calls and
when said application specific system library calls are supported by said first executable environment, performs said application specific system library calls within said first executable environment, and
when said application specific system library calls are not supported by said first executable environment, translates the application specific system library calls into at least one of system library calls and instruction codes compatible with the operating system.

8. A method according to claim 7, wherein a call to a software application specific dynamic linked library (DLL) from the software application is translated into at least one of a call to an operating system DLL and instructions for carrying out the software application specific DLL functions without installation of the software application specific DLL within the operating system.

9. A method according to claim 1, wherein an application in execution within the first executable environment executes as if installed directly within the operating system of the host computer system, the first executable environment varying data provided to and from the application during execution thereof to mimic a fixed installation thereof on the host computer system.

10. A method according to claim 1, wherein the first executable environment is executed from the removable peripheral memory storage device.

11. A method according to claim 1, comprising:
installing the first executable environment within each of a plurality of host computer systems, each host computer wherein the first executable environment is installed being compatible with the software application installed within the removable peripheral memory storage device.

12. A method according to claim 1, where the first executable environment is a small portable application for installation from the removable peripheral memory storage device in which the software application is installed.

13. A method according to claim 1, comprising authorizing a user of the removable peripheral memory storage device before executing the software application.

14. A method according to claim 13, wherein the authorizing of a user includes:
sensing biometric information of the user;
comparing data based on the sensed information against stored template data to determine a correlation therebetween; and,
in dependence upon the correlation performing one of authorizing the user and other than authorizing the user.

15. A method according to claim 13, wherein user data associated with the software application is stored within the removable peripheral memory storage device on which the software application is installed.

16. A method according to claim 1, wherein the removable peripheral memory storage device must be coupled to the host computer system during host computer system start up in order for the first executable environment to execute.

17. A method according to claim 1, wherein the removable peripheral memory storage device comprises a portable hard drive.

18. A method according to claim 1, wherein the first environment selects a software application from a plurality of similar software applications for execution in dependence upon at least one of an operating system and a processor of the host computer system.

19. A method according to claim 1, wherein at least one of the first executable environment and the software application are stored within a network accessible storage medium for access by each of a plurality of computers.

20. A method according to claim 19, wherein the first executable environment comprises an environment for portable installation within the network drive, the environment for execution on any of a number of different computer systems.

21. A method according to claim 19, wherein both the first executable environment and the software application are stored within a same network accessible storage medium.

22. A method according to claim 19, wherein both the first executable environment and the software application are stored within different network accessible storage media.

23. A removable peripheral memory storage device comprising:
non-volatile random access memory; and
software application data stored within the non-volatile random access memory, the software application data for when executed within a first executable environment executing within an operating system of a host system resulting in execution of the software application, the first executable environment other than any of:
an operating system for the host system,
an operating system emulator for an operating system other than the operating system of the host system, and
a processor emulator for a processor other than the host system processor, the first executable environment for execution within the operating system of the host system and for, when the software application is executed within the first executable environment:
intercepting an environment specific call made by the software application intended for the host system to perform a function;
determining whether the environment specific call is supported by the first executable environment and whether the environment specific call is supported by the host system; and
making an executable environment call to the first executable environment to perform the function if the environment specific call is supported by the first executable environment and making a system library call to the host system to perform the function if the environment specific call is supported by the host system and if the environment specific call is other than supported by the first executable environment,
wherein the software application once installed within the removable peripheral memory storage device is executable within any of a plurality of host computer systems each supporting the first executable environment absent installation of system level files, and data of the software application within each of the plurality of host computer systems.

24. A method comprising:
providing a first executable environment, the first executable environment for execution within a first operating system environment of a first host computer system, wherein the first executable environment is for other than emulating any of:
a processor external to the first host computer system, and
an operating system other than the first operating system environment;
providing a second executable environment, the second executable environment for execution within a second operating system environment of a second host computer system,
wherein the second executable environment is for other than emulating any of:
a processor external to the second host computer system, and
an operating system other than the second operating system environment;
providing a software application originally configured for installation and execution within the first operating system environment and the second operating system environment, the software application originally configured for fixed system installations, and configured for other than being ported from one host computer system to another, the software application provided for installation and execution within the first executable environment and the second executable environment; and,
installing the software application within the first executable environment and within the second executable environment, the installed software application installed within a storage device for execution within each of the first executable environment and the second executable environment and accessible to each of the host computer system and the second host computer system,
wherein during execution of the software application within the first executable environment, the first executable environment for:
intercepting a first environment specific call made by the software application intended for the first host computer system to perform a first function
determining whether the first environment specific call is supported by the first executable environment and whether the first environment specific call is supported by the first host computer system; and
making a first executable environment call to the first executable environment to perform the first function if the first environment specific call is supported by the first executable environment and making a first system library call to the first host computer system to perform the first function if the first environment specific call is supported by the first host computer system and if the first environment specific call is other than supported by the first executable environment, and wherein during execution of the software application within the second executable environment, the second executable environment for:

intercepting a second environment specific call made by the software application intended for the second host computer system to perform a second function;

determining whether the second environment specific call is supported by the second executable environment; and making a second executable environment call to the second executable environment to perform the second function if the second environment specific call is supported by the second executable environment and making a second system library call to the second host computer system to perform the second function if the second environment specific call is supported by the second host computer system and if the second environment specific call is other than supported by the second executable environment.

25. A method according to claim 24, wherein an application in execution within the first executable environment executes as if installed directly within the operating system of the first host computer system, the first executable environment varying data provided to and from the application during execution thereof to mimic a fixed installation thereof on the first host computer system and an application in execution within the second executable environment executes as if installed directly within the operating system of the second other host computer system, the second executable environment varying data provided to and from the application during execution thereof to mimic a fixed installation thereof on the second other host computer system.

26. A method according to claim 25, wherein the first host computer system and the second other host computer system are configured differently.

27. A method according to claim 25, wherein data that is varied includes data relating to a system registry of each of the first host computer system and the second other host computer system.

* * * * *